United States Patent
Gailloux et al.

(10) Patent No.: US 10,268,998 B1
(45) Date of Patent: Apr. 23, 2019

(54) PREPAID ACCOUNT PAYMENT TIERS

(71) Applicant: Sprint Communications Company L.P., Overland Park, KS (US)

(72) Inventors: Michael A. Gailloux, Overland Park, KS (US); Kenneth W. Samson, Belton, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 415 days.

(21) Appl. No.: 14/952,725

(22) Filed: Nov. 25, 2015

Related U.S. Application Data

(63) Continuation of application No. 13/183,436, filed on Jul. 15, 2011, now abandoned.

(51) Int. Cl.
| | |
|---|---|
| *G06Q 20/14* | (2012.01) |
| *G06Q 20/28* | (2012.01) |
| *G06Q 20/32* | (2012.01) |
| *H04M 15/00* | (2006.01) |
| *H04M 17/00* | (2006.01) |

(52) U.S. Cl.
CPC .......... *G06Q 20/145* (2013.01); *G06Q 20/28* (2013.01); *G06Q 20/325* (2013.01); *H04M 15/8083* (2013.01); *H04M 17/10* (2013.01)

(58) Field of Classification Search
CPC ................. H04M 17/00; H04W 4/24
See application file for complete search history.

(56) References Cited

U.S. PATENT DOCUMENTS

| | | | |
|---|---|---|---|
| 5,822,410 A | 10/1998 | McCausland et al. | |
| 6,597,903 B1 | 7/2003 | Dahm et al. | |
| 7,958,029 B1 | 6/2011 | Bobich et al. | |
| 2007/0073618 A1 | 3/2007 | Yu et al. | |
| 2007/0099609 A1* | 5/2007 | Cai ..................... | H04L 41/5054 455/428 |

OTHER PUBLICATIONS

Express Computer. "Churn management solutions key to telco bottom lines" Sep. 24, 2003. Retrieved from: <<https://web.archive.org/web/20030924213941/http://www.express-computer.com:80/20030922/indiatrends01.shtml>> Retrieved on May 10, 2018. 4 pages.*

Tutorials Point. "Telecom Billing—Pre-Paid vs Post-Paid" Nov. 17, 2010. Retrieved online from <<https://web.archive.org/web/20101117210957/https://www.tutorialspoint.com/telecom-billing/prepaid-vs-postpaid.htm>> Retrieved on May 13, 2018. 2 pages.*

(Continued)

*Primary Examiner* — Hajime Rojas

(57) ABSTRACT

A method of determining a payment tier for a portable electronic device comprising determining by an application executing on a computer a device plan for the portable electronic device, tenure with the device plan, and payment history. The method also comprises determining by the application the payment tier based on the determination of the device plan for the portable electronic device, tenure with the device plan, and payment history. The method also comprises billing an account associated with the portable electronic device based on the determination of the payment tier.

17 Claims, 8 Drawing Sheets

(56) References Cited

OTHER PUBLICATIONS

"AT&T General Terms of Service", Jun. 10, 2010, AmazonWireless Help >AT&T Customers > AT&T Contract Terms and Conditions. Retrieved from http://web.archive.org/web/20100610050016/http://wireless.amazon.com/help/200307870/, pp. 1-9.

"T Mobile PAYG Top Up £10.00 Each Month and Get Free Internet and Texts the Next Month, Every Month", 2009 retrieved online Mar. 25, 2015, http://www.hotukdeals.com/deals/t-mobile-payg-top-up-10-each-month-519258, 6 pages.

Pre-Interview Communication dated Jan. 25, 2013, U.S. Appl. No. 13/183,436, filed Jul. 15, 2011.

Final Office Action dated Mar. 19, 2013, U.S. Appl. No. 13/183,436, filed Jul. 15, 2011.

Final Office Action dated Apr. 15, 2013, U.S. Appl. No. 13/183,436, filed Jul. 15, 2011.

Advisory Action dated Jun. 25, 2013, U.S. Appl. No. 13/183,436, filed Jul. 15, 2011.

Office Action dated Mar. 31, 2015, U.S. Appl. No. 13/183,436, filed Jul. 15, 2011.

Final Office Action dated Jul. 29, 2015, U.S. Appl. No. 13/183,436, filed Jul. 15, 2011.

Advisory Action dated Oct. 7, 2015, U.S. Appl. No. 13/183,436, filed Jul. 15, 2011.

Gailloux, Michael A., et al., Patent Application entitled "Prepaid Account Payment Tiers," filed Jul. 15, 2011, U.S. Appl. No. 13/183,436.

\* cited by examiner

PREPAID ACCOUNT PAYMENT TIERS

CROSS-REFERENCE TO RELATED APPLICATIONS

This application is a continuation of and claims priority under 35 U.S.C. § 120 to U.S. patent application Ser. No. 13/183,436, filed on Jul. 15, 2011, entitled "Prepaid Account Payment Tiers," by Michael A. Gailloux, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of portable electronic devices may utilize a variety of different services such as web services or other data services, voice call services, and short message service (SMS—also known as text messaging). These services may be offered by a communication service provider of portable electronic devices. Service providers may offer one or more of phone service, internet service, text messaging service, and/or other portable electronic device communication services, and may bundle more than one of these services. The bundle of services may be referred to as a service plan or device plan. The device plan may be provided as a post-pay billing system, such that a user is billed for services already provided. For example, a user may be billed at the end of a month for the services they have used in that month. Alternatively, services may be prepaid, such that a user pays for an amount of service, which may be applied as a credit to the user's account. The user may then utilize the service until the amount of prepaid service is consumed. Then, if desired, the user may buy additional service credit in a variety of increments or units. Voice calling, for example, may be purchased as a number of calling minutes or unlimited calling minutes for a specified period of time. For prepaid services, users may change service providers at any time at no cost to themselves.

SUMMARY

In an embodiment, a method of determining a payment tier for a portable electronic device is disclosed. The method comprises determining by an application executing on a computer a device plan for the portable electronic device, tenure with the device plan, and payment history. The method also comprises determining by the application the payment tier based on the determination of the device plan for the portable electronic device, tenure with the device plan, and payment history. The method also comprises billing an account associated with the portable electronic device based on the determination of the payment tier.

In an embodiment, a method of presenting notifications on a portable electronic device related to a payment tier for the portable electronic device is disclosed. The method comprises receiving by the portable electronic device a message, presenting by the portable electronic device the message in a display frame, and presenting by the portable electronic device a notification related to a payment tier that is determined based on a device plan for the portable electronic device, tenure with the device plan, and payment history.

In an embodiment, a method of determining a payment tier for a portable electronic device is disclosed. The method comprises determining by an application executing on a computer a current payment tier for a portable electronic device, determining by the application a device plan for the portable electronic device, tenure with the device plan, and payment history, and determining by the application a change in the payment tier based on the device plan, tenure with the device plan, and payment history.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches several methods which may increase customer loyalty for service providers of prepaid portable electronic device services. Because a portable electronic device prepaid services user may switch service providers at any time, especially after using the prepaid services, service providers must compete in a low margin environment. To combat users from switching service providers, incentives may be used to keep high valued users. One of the best incentives is price. Thus, payment tiers that change based on a users past usage are useful.

For certain device plans, there may be different payment tiers for different users. For example, a long term user who pays on-time may be offered a lower price than a new user. The new user would have an incentive to remain in the device plan, so as to move into the lower payment tier. Likewise, the long term user would have an incentive to remain in the device plan, so as not to lose the lower payment tier.

In order to effectuate these incentives, methods are disclosed for determining to what payment tier a user belongs. Additionally, methods for notifying a user of what payment tier they are in, a change in a payment tier, and impending changes in payment tier are disclosed.

Figure 1:
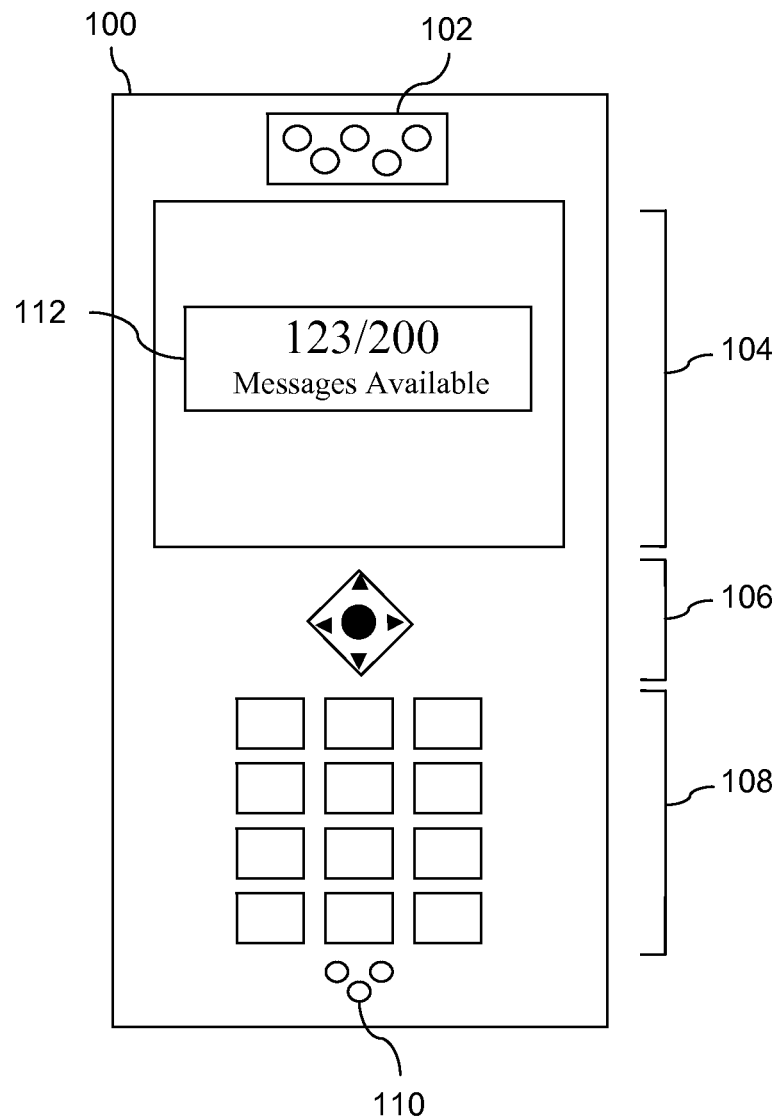
FIG. 1 illustrates a portable electronic device, according to an embodiment of the disclosure.

Now turning to FIG. 1, a portable electronic device 100 is illustrated. The portable electronic device 100 includes a speaker or earpiece 102, a display 104, a button, set of buttons, or touch-sensitive surface 106 for cursor movement or such on the display 104, another touch-sensitive surface and/or keys 108 for input by a user, and a microphone 110. The portable electronic device 100 may present options for the user to select, controls for the user to actuate, and/or cursors or other indicators for the user to direct. The portable electronic device 100 may further accept data entry from the user, including numbers to dial or various parameter values for configuring the operation of the handset. The portable electronic device 100 may further execute one or more software or firmware applications in response to user commands. These applications may configure the portable electronic device 100 to perform various customized functions in response to user interaction. Additionally, the portable electronic device 100 may be programmed and/or configured over-the-air, for example from a wireless base station, a wireless access point, or a peer portable electronic device 100. The portable electronic device 100 may present options for the user to select, controls for the user to actuate, and/or cursors or other indicators for the user to direct. The portable electronic device 100 may further accept data entry from the user, including numbers to dial or various parameter values for configuring the operation of the handset. The portable electronic device 100 may further execute one or more software or firmware applications in response to user commands. These applications may configure the portable electronic device 100 to perform various customized functions in response to user interaction. Additionally, the portable electronic device 100 may be programmed and/or configured over-the-air, for example from a wireless base station, a wireless access point, or a peer portable electronic device 100. FIG. 1 also depicts a message 112, which will be discussed in more detail hereinafter.

Figure 2:
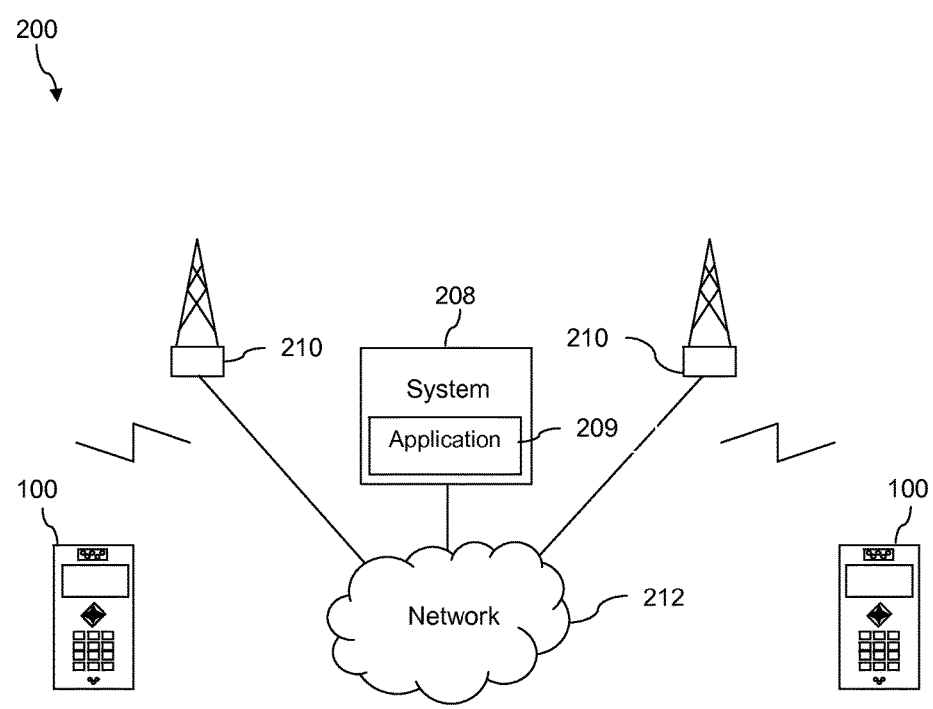
FIG. 2 illustrates a communication system, according to an embodiment of the disclosure.

FIG. 2 shows a wireless communications system 200 including the portable electronic device 100. FIG. 2 depicts the portable electronic device 100, which is operable for implementing aspects of the present disclosure, but the present disclosure should not be limited to these implementations. In FIG. 2, two portable electronic devices 100 are depicted in order to illustrate communication from one portable electronic device to another, wherein each may be the same or similar. For the purposes of this disclosure, whether the hardware and software of the two portable electronic devices 100 are identical or not, their basic functions may be considered to be the same.

Though illustrated as a mobile phone, the portable electronic device 100 may take various forms including a wireless handset, a pager, a personal digital assistant (PDA), a gaming device, a media player, or other. The portable electronic device 100 may execute a web browser application which enables the display 104 to show a web page. The web page may be obtained via wireless communications with a base transceiver station (BTS) 210, a peer portable electronic device 100 or any other wireless communication network or system. Two base transceiver stations 210 are illustrated, and it should be understood that the wireless communication system may comprise additional base transceiver stations, which may or may not comprise identical hardware, but whose functions may be considered to be the same. The portable electronic device 100 may access the base transceiver stations 210 through a peer portable electronic device 100 acting as an intermediary, in a relay type or hop type of connection. In some instances, the portable electronic device 100 may be in communication with multiple base transceiver stations 210 at the same time. The base transceiver station 210 is coupled to a network 212. The network 212 may comprise a combination of public and private networks. The network 212 may comprise both wired communication links and wireless communication links. The network 212 may comprise, in part, the Internet, a cellular voice calling network, or a cellular data network. Via the link to the network 212, the base transceiver stations 210 may be connected to another system, such as system 208.

The system 208 may be, for example, a server of a wireless communication service provider and may include one or more processors. The system 208 may execute an application 209. The application 209, along with the system 208, may be configured to communicate information, such as information pertaining to the account of the user of the portable electronic device 100, between the service provider and the user of the portable electronic device 100. The portable electronic device 100 may access the system 208 through the network 212, through the base transceiver stations 210.

In an embodiment, portable electronic device 100 may be configured by a user (also referred to as a customer of a wireless communication service provider, or merely as a customer) with a device plan. The device plan is the plan for which the portable electronic device 100 may access the network 212. In some embodiments the device plan may be a prepaid unlimited voice calling plan for a finite amount of time, for example, one month. In other embodiments, the device plan may be a prepaid number of minutes for voice calling. In another embodiment, the device plan may relate to an amount of data that the portable electronic device 100 may access, either for a finite period of time, or specific amount of data.

In an embodiment, the application 209 is configured to determine the device plan for the portable electronic device 100. The application 209 is also configured to determine the tenure that the portable electronic device 100 has been associated with that device plan. Thus, the application 209 may determine how long portable electronic device 100 has been associated with the device plan. The application 209 is also configured to determine the payment history associated with portable electronic device 100. This means that the application 209 may determine whether past payments associated with portable electronic device 100 have been timely made (i.e. whether the payments made for portable electronic device 100 have been made such that any recurring charge has been made by the time that it is due or within a grace period). In alternative embodiments, application 209 may assess the frequency of non-recurring charges (i.e. whether payments for portable electronic device 100 have been made within a certain threshold time period). The application 209 may be able to make these determinations by analyzing billing and payment records stored in a database (not shown) maintained by the wireless service provider.

In an embodiment, the application 209 is also configured to determine a payment tier based on the determination made as to the device plan for portable electronic device 100, tenure with the device plan, and payment history. In an embodiment, the payment tier is the amount required to be paid for a specific device plan. There may be more than one payment tier for each device plan, such that different users may pay different payments for the same device plan based on the portable electronic device's 100 tenure with the device plan, and payment history.

In an embodiment, the payment tier may be determined by application 209 based on the determination that device plan for portable electronic device 100 is a prepaid calling plan. Even more specifically, in one embodiment, the payment tier may be determined based on the device plan being a monthly unlimited voice calling plan. In another embodiment, the payment tier is determined based on the device plan being a prepaid data plan. In an alternative embodiment, the payment tier may be determined by application 209 based on the determination that the device plan meets a threshold level for a package of voice calling minutes or number of texts or for the stored value of the account associated with portable electronic device 100.

In an embodiment, the payment tier may be determined by application 209 based on the determination that the payment history for portable electronic device 100 shows that a predetermined number of on-time payments have been made under the device plan for the portable electronic device 100. The predetermined number of on-time payments may be six monthly payments. That is, the payment for the device plan for portable electronic device 100 has been paid timely for six months. In other embodiments, payment tier may be determined by application 209 based on the number of consecutive on-time payments. Thus, the payment tier for the use of portable electronic device 100 may be different for the same device plan for users who make timely payments.

In other embodiments, the payment tier may be determined by application 209 based on the determination that payment history for portable electronic device 100 shows that a predetermined number of payments have been made on-time or within a predetermined number of days of being on-time. This may be known as a grace period. In some embodiments, the grace period may be one, two, or three days. By building in a grace period, the customer maintains an incentive to remain with the wireless service provider even when the customer misses an on-time payment by a few days which may be caused due to the customer not realizing that the prepaid device plan has ended until the services provided to the portable electronic device 100 by the wireless service provider stop working.

In an embodiment, the payment tier may be determined by application 209 based on the determination that the tenure with the device plan for portable electronic device 100 is a predetermined number of consecutive months. That is, if the application 209, determines that portable electronic device 100 has been assigned to a specific device plan for a predetermined number of consecutive months, then the payment tier may be changed. Thus, the payment tier for the use of portable electronic device 100 may be different for the same device plan for users who maintain the same device plan for different periods of time. Because the payment tier may be based on prepaid device plans, tenure, and payment history, users who maintain a device plan for longer periods with on-time payment histories may be rewarded with a lower payment.

In an embodiment, the missing of an on-time payment, either directly on-time or within the grace period, does not cause the portable electronic device 100 to lose accumulated tenure. However, the tenure does not increase for the time period of the late payment. That is, the customer does not lose accumulated tenure, but the subject time period with a late payment may not count towards additional tenure.

In an embodiment, the payment tier determination is table driven. That is to say, that the bases for the determination of payment tier: device plan, tenure, and payment history, are compiled in a table maintained by the wireless service provider, such as a spreadsheet or database, for each portable electronic device 100. Once all of the requirements for a certain payment tier are met in the table, then that payment tier is assigned to the portable electronic device 100.

In an embodiment, the application 209 may also be configured to bill the customer, or owner, of the portable electronic device 100 based on the payment tier determined by application 209. In other embodiments, application 209 is configured to send a message to a separate billing platform indicating what payment tier portable electronic device 100 is assigned or that the payment tier has transitioned from one tier to another. In still other embodiments, application 209 may set a flag in a database designating what payment tier the portable electronic device 100 is assigned. A separate billing platform may then respond to the flag and bill the customer based on the payment tier determined. More specifically, in certain embodiments, application 209 may bill the user of portable electronic device 100, debit the prepaid account associated with portable electronic device 100 and notify the user of portable electronic device 100 of the debit, and/or notify the user of portable electronic device 100 of the amount that the prepaid account associated with portable electronic device 100 will be debited in a certain period of time enabling the user to replenish the account prior to the automatic debiting. In an embodiment, when an attempt is made by the portable electronic device 100 to originate a phone call or to send a text message, the application 209 may provide an authorization or trigger to permit the call origination or text sending operation to proceed.

Additionally, in some embodiments, application 209 may send the portable electronic device 100 a message identifying the payment tier that was determined. The determined payment tier may be sent to portable electronic device 100 by messaging, such as a text message, e-mail, voice, voice messaging, or any other medium for transmitting a message to a portable electronic device. In other embodiments, application 209 may send portable electronic device 100 the payment tier upon a determination of a change in the payment tier for the device plan for portable electronic device 100. In an alternative embodiment, application 209 may send portable electronic device 100 a message notifying of an upcoming change in the payment tier for the device plan of portable electronic device 100 should the portable electronic device 100 remain in the device plan.

In some embodiments, application 209 may send the portable electronic device 100 a message reminding the customer of his or her accumulated tenure with the device plan sometimes in advance of key dates, such as a timely payment date. This may promote the customer's behavior in making an on-time payment and psychologically link the customer's financial interests (lowered device plan costs) with continuing service with the wireless service provider.

In some embodiments, this messaging notification to the portable electronic device 100 by the application 209 may be triggered at the time that the recurring charge for the device plan is calculated and/or billed to the customer. That is, the notification via messaging of the payment tier to the portable electronic device 100 may occur at the time that the bill, which may be calculated and sent monthly, is calculated and/or sent to the customer. In an embodiment, the messaging notification may be included with the recurring charge which is sent to the customer.

The advantages of basing the payment tier on the device plan, tenure, and payment history are enormous. In the prepaid wireless communications market, a customer may be subsidized to start a device plan with a wireless service provider through hardware subsidies (i.e. given a free portable electronic device 100 or a reduced cost portable electronic device 100) or through other subsidies. Thus, it is important to the wireless service provider that these subsidies are repaid by the customer. This may be achieved through the device plan.

By basing the payment tier on the device plan, tenure, and payment history, the prepaid customer is incentivized to remain with the wireless service provider for a longer period of time because he or she has the ability to move into or remain in a lower payment tier by remaining with the same wireless service provider. Hence, the customer may be likely to remain in the device plan with the wireless service provider for longer periods of time. Thus, the wireless service provider is more likely to recoup the subsidy provided to the customer and to make higher profits once the subsidy is repaid. If these incentives allow the wireless service provider, for example, to maintain each of its customers just one additional month than he or she otherwise would remain, profitability soars. For example, if a wireless service provider has 6 million prepaid customers paying $50 per month which receive a 20% discount to their monthly bill as an incentive and each customer remains with the service provider for one additional month due to these incentives, the incentives will be worth $240 million more in additional revenue to the wireless service provider.

While described above with reference to pre-paid type of accounts, it is understood that, in an embodiment, like policies and incentives may be adapted for post-paid type of accounts. For example, by basing the payment tier on the device plan, tenure, and payment history, the post paid customer may also be incentivized. The post paid customer may be encouraged to remain with the wireless service provider after any contract period and may also be encouraged to make timely payments during and after any contract period. The system 208 would work in a similar manner as the system 208 works for a prepaid customer.

For example, application 209 may determine a device plan for portable electronic device 100, tenure with the device plan, and payment history. The determination of the device plan may comprise determining, by application 209, that portable electronic device 100 is assigned to a post paid calling plan and/or data plan. The determination of the payment history may comprise determining, by application 209, whether a predetermined number of on-time payments have been made under the device plan for portable electronic device 100. In some embodiments, the predetermined number of on-time payments is six monthly payments. The determination of the tenure with the device plan may comprise determining, by application 209, a number of consecutive months that the portable electronic device has been assigned to the device plan.

Application 209 may also determine a payment tier based on the determination of the device plan for portable electronic device 100, tenure with the device plan, and payment history. Because the payment tier is based on the tenure and payment history, as well as the device plan, the post paid customer is incentivized to remain in the data plan to remain or move into in a preferential payment tier even when the post paid customer is not contractually required to remain with the data plan.

Figure 3:
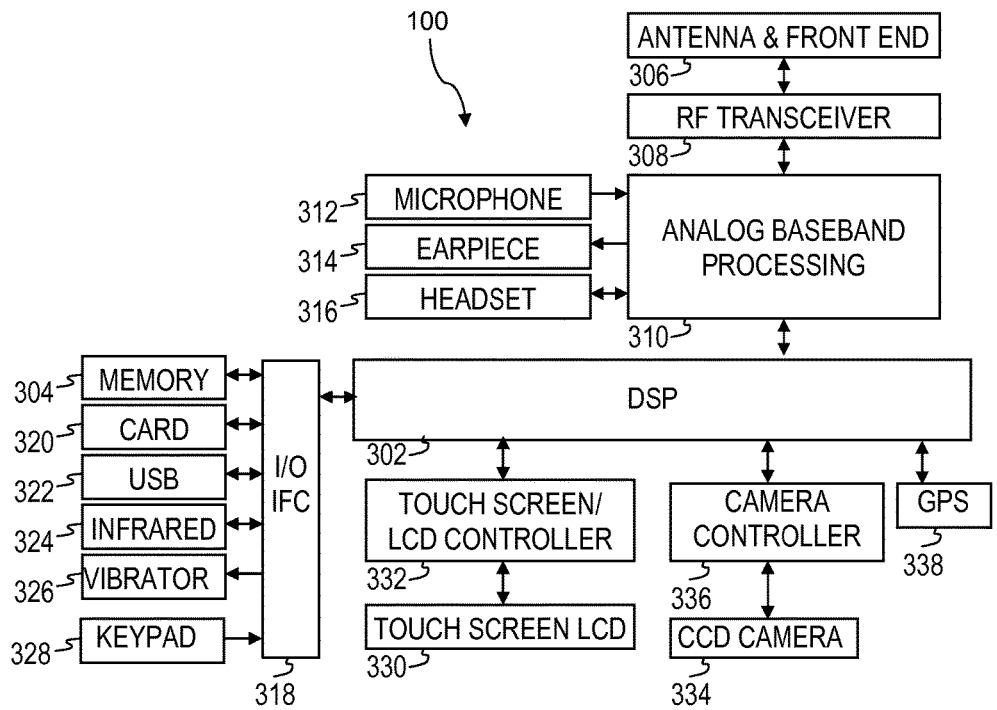
FIG. 3 is a block diagram of a portable electronic device, according to an embodiment of the disclosure.

FIG. 3 shows a block diagram of the portable electronic device 100. While a variety of known components of portable electronic devices 100 are depicted, in an embodiment a subset of the listed components and/or additional components not listed may be included in the portable electronic device 100. The portable electronic device 100 includes a digital signal processor (DSP) 302 and a memory 304. As shown, the portable electronic device 100 may further include an antenna and front end unit 306, a radio frequency (RF) transceiver 308, an analog baseband processing unit 310, a microphone 312, an earpiece 314, a headset port 316, an input/output interface 318, a removable memory card 320, a universal serial bus (USB) port 322, an infrared port 324, a vibrator 326, a keypad 328, a touch screen liquid crystal display (LCD) with a touch sensitive surface 330, a touch screen/LCD controller 332, a charge-coupled device (CCD) camera 334, a camera controller 336, and a global positioning system (GPS) sensor 338. In an embodiment, the portable electronic device 100 may include another kind of display that does not provide a touch sensitive screen. In an embodiment, the DSP 302 may communicate directly with the memory 304 without passing through the input/output interface 318. Additionally, in an embodiment, the portable electronic device 100 may comprise other peripheral devices that provide other functionality.

The DSP 302 or some other form of controller or central processing unit operates to control the various components of the portable electronic device 100 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB port 322 and the infrared port 324. The USB port 322 may enable the portable electronic device 100 to function as a peripheral device to exchange information with a personal computer or other computer system. The infrared port 324 and other optional ports such as a Bluetooth interface or an IEEE 802.11 compliant wireless interface may enable the portable electronic device 100 to communicate wirelessly with other nearby handsets and/or wireless base stations.

The keypad 328 couples to the DSP 302 via the interface 318 to provide one mechanism for the user to make selections, enter information, and otherwise provide input to the portable electronic device 100. Another input mechanism may be the touch screen LCD 330, which may also display text and/or graphics to the user. The touch screen LCD controller 332 couples the DSP 302 to the touch screen LCD 330. The GPS sensor 338 is coupled to the DSP 302 to decode global positioning system signals, thereby enabling the portable electronic device 100 to determine its position.

Figure 4A:
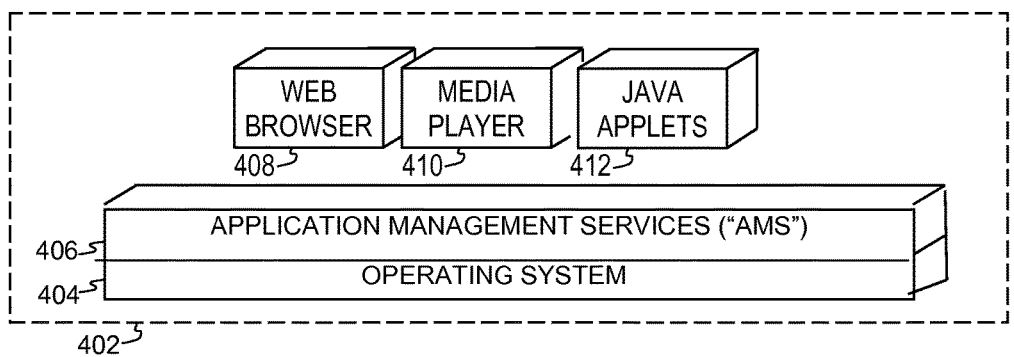
FIG. 4A is a block diagram of software architecture of a portable electronic device, according to an embodiment of the disclosure.

FIG. 4A illustrates a software environment 402 that may be implemented by the DSP 302. The DSP 302 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services ("AMS") 406 that transfer control between applications running on the portable electronic device 100. Also shown in FIG. 4A are a web browser application 408, a media player application 410, and JAVA applets 412. The web browser application 408 configures the portable electronic device 100 to operate as a web browser, allowing a user to enter information into forms and select links to retrieve and view web pages. The media player application 410 configures the portable electronic device 100 to retrieve and play audio or audiovisual media. The JAVA applets 412 configure the portable electronic device 100 to provide games, utilities, and other functionality.

Figure 4B:
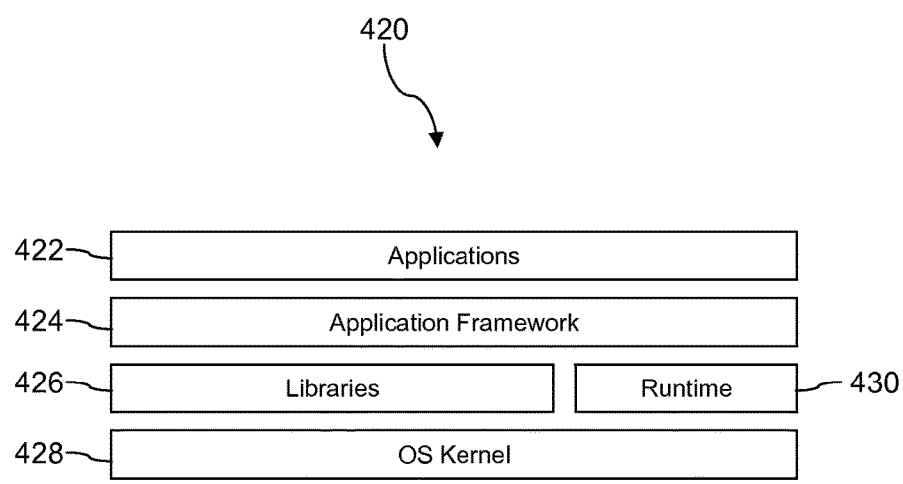
FIG. 4B is a block diagram of an alternative software architecture of a portable electronic device, according to an embodiment of the disclosure.

FIG. 4B illustrates an alternative software environment 420 that may be implemented by the DSP 302. The DSP 302 executes operating system kernel 428 and an execution runtime 430. The DSP 302 executes applications 422 that may execute in the execution runtime 430 and may rely upon services provided by the application framework 424. Applications 422 and the application framework may rely upon functionality provided via the libraries 426.

Figure 5:
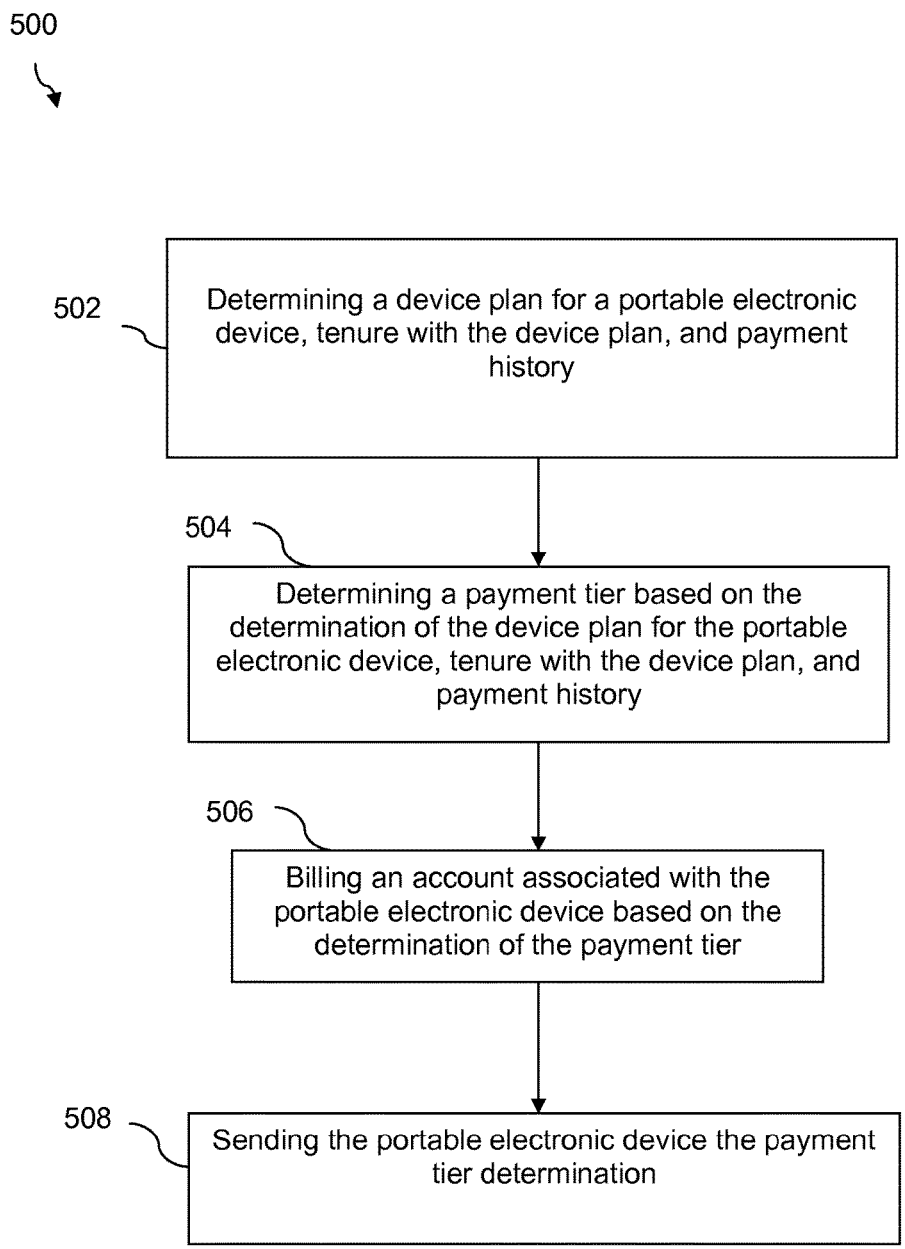
FIG. 5 is a flowchart, according to an embodiment of the disclosure.

Now turning to FIG. 5, a flowchart 500 of an embodiment of the disclosure is illustrated. In block 502, a determination is made of a device plan for portable electronic device 100, tenure with the device plan, and payment history. The determination may be made by application 209 executing on system 208. The determination of the device plan may comprise determining, by application 209, whether portable electronic device 100 is assigned to a prepaid calling plan or a monthly unlimited voice calling plan. The determination of the payment history may comprise determining, by application 209, whether a predetermined number of on-time payments have been made under the device plan for portable electronic device 100. In some embodiments, the predetermined number of on-time payments is six monthly payments. The determination of the tenure with the device plan may comprise determining, by application 209, a number of consecutive months that the portable electronic device has been assigned to the device plan.

The method continues in block 504 with the determination by application 209 of a payment tier based on the determination of the device plan for portable electronic device 100, tenure with the device plan, and payment history. In block 506, the application 209 may bill an owner, customer, user, or account associated with portable electronic device 100 based on the payment tier determined. The billing may comprise debiting the prepaid account associated with portable electronic device 100. In block 508, the application 209 may send the portable electronic device via messaging notification of the payment tier determination. As mentioned previously, this message may be in the form of a text message and may comprise the determination that the payment tier changed from a previous payment tier. In an embodiment, the processing of the method may comprise a step where when a communication attempt is initiated by the portable electronic device 100, an authorization is determined based at least in part on the device plan and the payment history before allowing the communication attempt to continue processing in the network 212.

Figure 6:
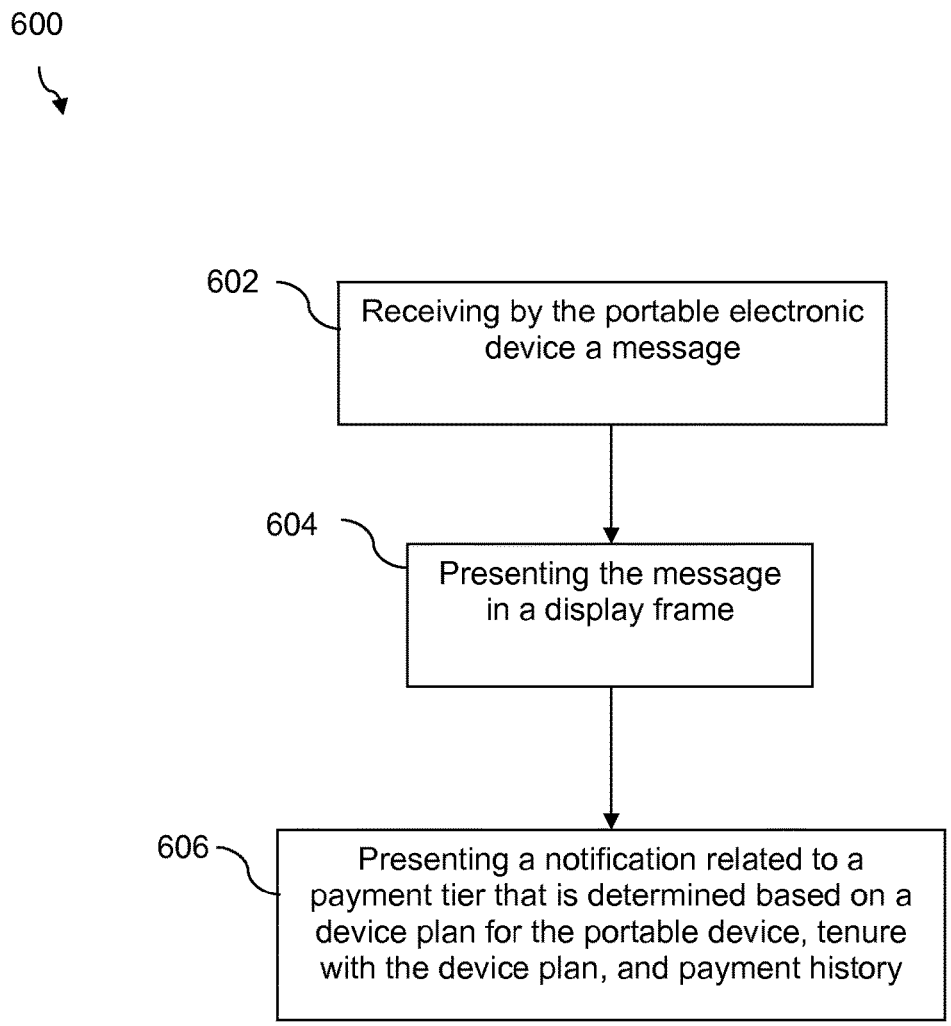
FIG. 6 is a flowchart, according to an embodiment of the disclosure.

FIG. 6 illustrates a flowchart 600 of an embodiment of the present disclosure. In block 602, the portable electronic device 100 receives a message. As previously mentioned, portable electronic device 100, in some embodiments, may comprise a mobile phone, a personal digital assistant, or a media player and the message may be a text message. In block 602, portable electronic device 100 receives a message. In block 604, the message is presented by the portable electronic device 100 in a display frame. In block 606, a notification is presented related to a payment tier that is determined based on a device plan for portable electronic device 100, tenure with the device plan, and payment history. The presentation of the notification, in some embodiments, may comprise displaying a change in the payment tier on a display of portable electronic device 100, while in other embodiments, may comprise displaying an upcoming change in the payment tier on a display of portable electronic device 100 based on portable electronic device 100 remaining in the device plan.

Figure 7:
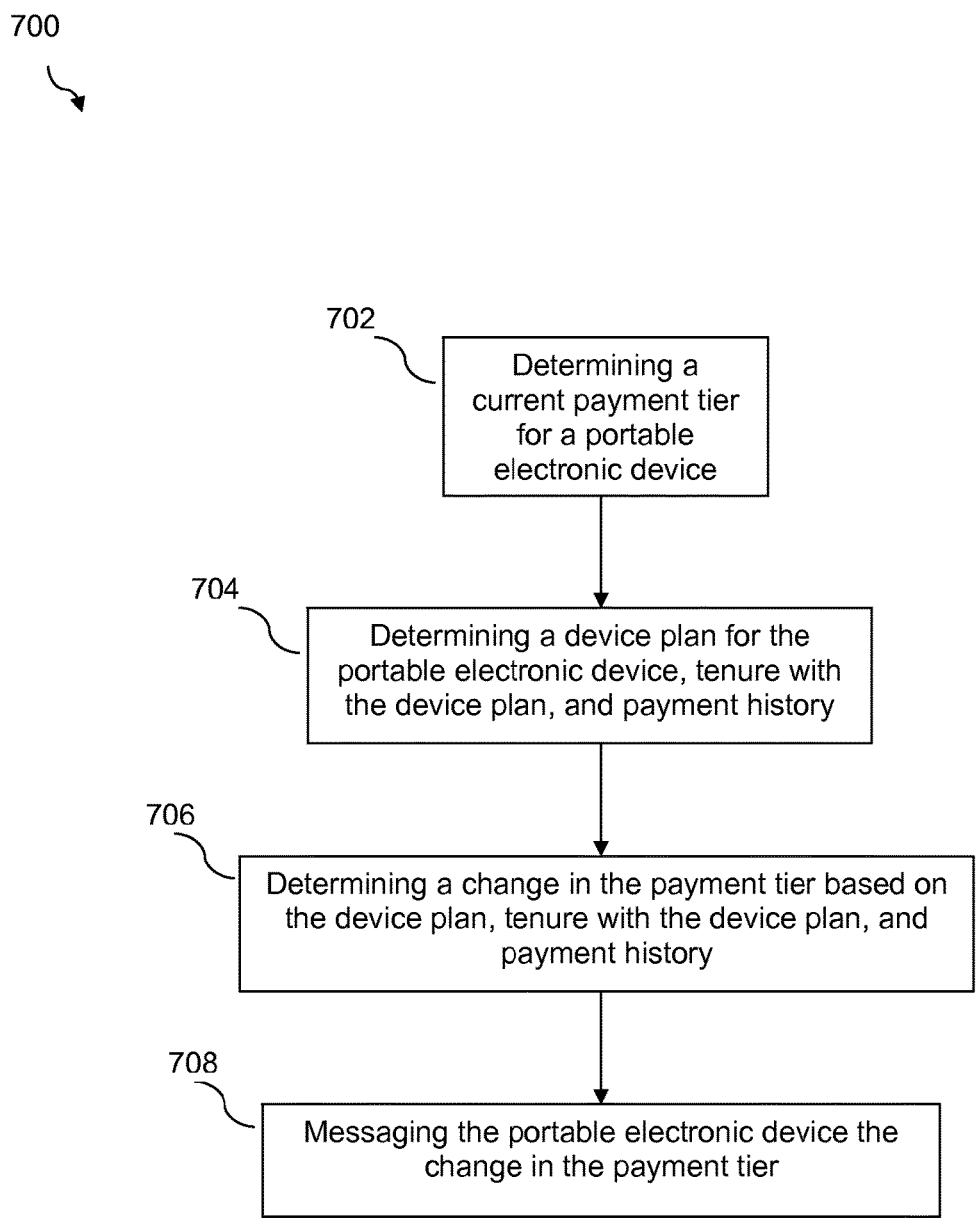
FIG. 7 is a flowchart, according to an embodiment of the disclosure.

In FIG. 7, a flowchart 700 of an embodiment of the present disclosure is illustrated. In block 702, a determination is made by application 209 of a payment tier for a portable electronic device. In block 704, a determination is made by application 209 of a device plan for the portable electronic device 100, tenure with the device plan, and payment history. The determination of the device plan may comprise determining, by application 209, whether portable electronic device 100 is assigned to a prepaid calling plan. The determination of the payment history may comprise determining, by application 209, whether a predetermined number of on-time payments have been made under the device plan for portable electronic device 100. The determination of the tenure with the device plan may comprise determining, by application 209, a number of consecutive months that the portable electronic device has been assigned to the device plan.

In block 706, a determination is made by application 209 of a change in the payment tier based on the device plan, tenure with the device plan, and payment history. In block 708, the application 209 may message the portable electronic device a change in the payment tier of the portable electronic device 100.

Figure 8:
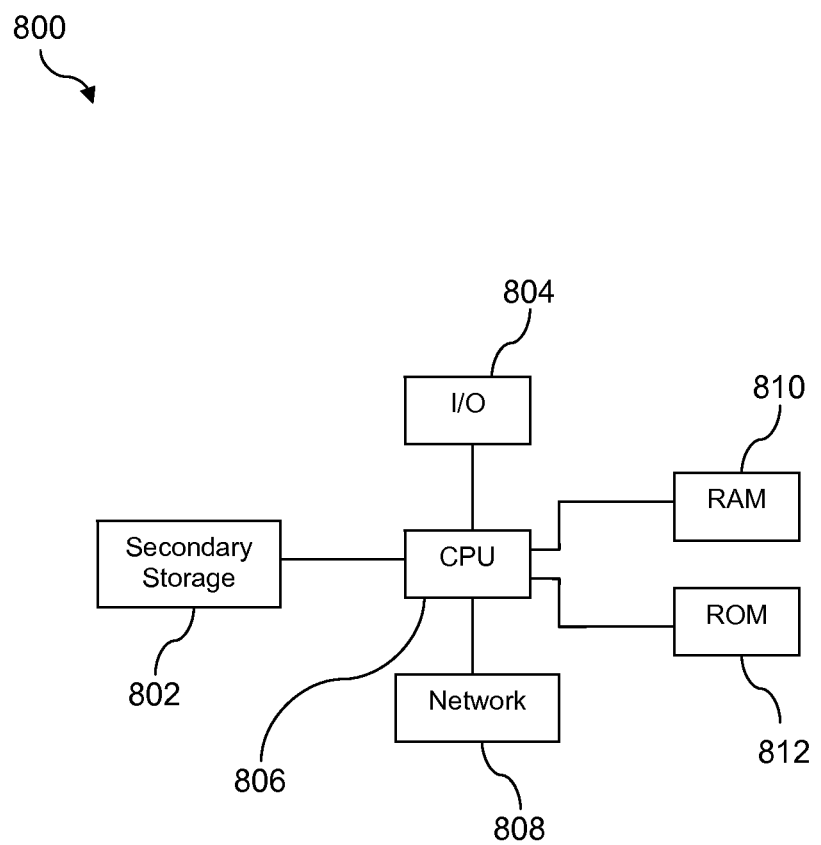
FIG. 8 illustrates an exemplary computer system, according to an embodiment of the disclosure.

FIG. 8 illustrates a computer system 800 suitable for implementing one or more embodiments disclosed herein. The computer system 800 includes a processor 806 (which may be referred to as a central processor unit or CPU) that is in communication with memory devices including secondary storage 802, read only memory (ROM) 812, random access memory (RAM) 810, input/output (I/O) devices 804, and network connectivity devices 808. The processor 806 may be implemented as one or more CPU chips.

It is understood that by programming and/or loading executable instructions onto the computer system 800, at least one of the CPU 806, the RAM 810, and the ROM 812 are changed, transforming the computer system 800 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 802 is typically comprised of one or more disk drives or tape drives and is used for non-volatile storage of data and as an over-flow data storage device if RAM 810 is not large enough to hold all working data. Secondary storage 802 may be used to store programs which are loaded into RAM 810 when such programs are selected for execution. The ROM 812 is used to store instructions and perhaps data which are read during program execution. ROM 812 is a non-volatile memory device which typically has a small memory capacity relative to the larger memory capacity of secondary storage 802. The RAM 810 is used to store volatile data and perhaps to store instructions. Access to both ROM 812 and RAM 810 is typically faster than to secondary storage 802.

I/O devices 804 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 808 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 808 may enable the processor 806 to communicate with the Internet or one or more intranets. With such a network connection, it is contemplated that the processor 806 might receive information from the network, or might output information to the network in the course of performing the above-described method steps. Such information, which is often represented as a sequence of instructions to be executed using processor 806, may be received from and outputted to the network, for example, in the form of a computer data signal embodied in a carrier wave.

Such information, which may include data or instructions to be executed using processor 806 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art.

The processor 806 executes instructions, codes, computer programs, scripts which it accesses from hard disk, floppy disk, optical disk (these various disk based systems may all be considered secondary storage 802), ROM 812, RAM 810, or the network connectivity devices 808. While only one processor 806 is shown, multiple processors may be present. Thus, while instructions may be discussed as executed by a processor, the instructions may be executed simultaneously, serially, or otherwise executed by one or multiple processors.

In an embodiment, the computer system 800 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 800 to provide the functionality of a number of servers that is not directly bound to the number of computers in the computer system 800. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 800, at least portions of the contents of the computer program product to the secondary storage 802, to the ROM 812, to the RAM 810, and/or to other non-volatile memory and volatile memory of the computer system 800. The processor 806 may process the executable instructions and/or data in part by directly accessing the computer program product, for example by reading from a CD-ROM disk inserted into a disk drive peripheral of the computer system 800. The computer program product may comprise instructions that promote the loading and/or copying of data, data structures, files, and/or executable instructions to the secondary storage 802, to the ROM 812, to the RAM 810, and/or to other non-volatile memory and volatile memory of the computer system 800.

In some contexts, the secondary storage 802, the ROM 812, and the RAM 810 may be referred to as a non-transitory computer readable medium or a computer readable storage media. A dynamic RAM embodiment of the RAM 810, likewise, may be referred to as a non-transitory computer readable medium in that while the dynamic RAM receives electrical power and is operated in accordance with its design, for example during a period of time during which the computer 800 is turned on and operational, the dynamic RAM stores information that is written to it. Similarly, the processor 806 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for dynamically adapting a wireless communication service on a communication network for a portable electronic device associated with at least one prepaid portable electronic device service, comprising:

determining, by a server at the communication network executing an application stored in non-transitory memory, that a portable electronic device is associated with at least one prepaid portable electronic device service provided by a wireless communication service provider, wherein the at least one prepaid portable electronic device service is free from a contract period with the wireless communication service provider;

in response to determining that the portable electronic device is associated with the at least one prepaid portable electronic device service:

determining, by the server, via a database communicatively coupled to the communication network, that a payment history corresponds with on-time payments and a tenure with the at least one prepaid portable electronic device service exceeds a predetermined number of consecutive months, wherein the tenure is a number of consecutive months that the portable electronic device has been assigned to the at least one prepaid portable electronic device service;

compiling, by the server, the payment history and the tenure in a table stored in non-transitory memory at the database in response to the determination that the payment history corresponds with on-time payments and the tenure exceeds the predetermined number of consecutive months;

determining, by the server, from a data structure stored in non-transitory memory, a payment tier of a plurality of payment tiers associated with the at least one prepaid portable electronic device service, wherein each of the plurality of payment tiers specifies a different payment amount required to be paid for the same at least one prepaid portable electronic device service, the payment tier being associated with a payment amount corresponding to a discount for the at least one prepaid portable electronic device service, and wherein the payment tier is determined based on the tenure with the at least one prepaid portable electronic device service and the payment history with the at least one prepaid portable electronic device service compiled in the table; and in response to determining the payment tier, setting, by the server, a flag in the database based on the determined payment tier;

in response to the flag set by the server, billing, by a computer system that is a billing platform, the payment amount to an account associated with the portable electronic device based on the determined payment tier;

subsequent to setting the flag, detecting, via the communication network by the server, an attempt to originate wireless communication by the portable electronic device; and responsive to detecting the attempt made by the portable electronic device to originate the wireless communication, determining, by the server, an authorization based at least in part on the payment history before allowing the attempt to originate the wireless communication by the portable electronic device to continue processing in the communication network and providing, by the server, the determined authorization to permit the wireless communication of the portable electronic device to proceed via the communication network, wherein setting the flag causes the server to alter an amount of data that the portable electronic device may access via traversal over the communication network based on the payment tier determined.

2. The method of claim 1, further comprising sending, by the server to the portable electronic device, a notification identifying the payment tier determined by the server.

3. The method of claim 1, further comprising sending, by the server to the portable electronic device, a notification identifying the payment tier based on determining that the payment tier changed from a previous payment tier of the plurality of payment tiers.

4. The method of claim 3, wherein the sending the portable electronic device the notification identifying the payment tier comprises sending, by the server to the portable electronic device, a text message.

5. The method of claim 1, wherein determining that the portable electronic device is associated with the at least one prepaid portable electronic device service provided by the wireless communication service provider comprises determining, by the server, that the portable electronic device is associated with a prepaid calling service.

6. The method of claim 5, wherein determining that the portable electronic device is associated with a prepaid calling service comprises determining, by the server, that the portable electronic device is associated with a monthly unlimited voice calling service.

7. The method of claim 1, wherein determining the payment history comprises determining, by the server, whether a predetermined number of on-time payments have been made for the at least one prepaid portable electronic device service.

8. The method of claim 7, wherein the predetermined number of on-time payments includes six monthly payments.

9. The method of claim 1, wherein the origination of wireless communication includes any of origination of a voice call or a text message.

10. A communication system for dynamically adapting a wireless communication service on a communication network for a portable electronic device associated with at least one prepaid portable electronic device service, comprising:
a server at a wireless communication service provider communicatively coupled to the communication network, the server comprising at least one processor communicatively coupled to a non-transitory memory storing an application that, upon execution by the at least one processor, configures the at least one processor of the communication system to:
determine that a portable electronic device is associated with at least one prepaid portable electronic device service provided by a wireless communication service provider, wherein the at least one prepaid portable electronic device service is free from a contract period with the wireless communication service provider,
in response to the determination that the portable electronic device is associated with the at least one prepaid portable electronic device service:
determine, via a database communicatively coupled to the communication network, that a payment history corresponds with on-time payments and a tenure with the at least one prepaid portable electronic device service exceeds a predetermined number of consecutive months, wherein the tenure is a number of consecutive months that the portable electronic device has been assigned to the at least one prepaid portable electronic device service,
compile, in a table stored in non-transitory memory at the database, the payment history and the tenure in response to the determination that the payment history corresponds with on-time payments and the tenure exceeds the predetermined number of consecutive months,
determine, from a data structure stored in non-transitory memory, a payment tier of a plurality of payment tiers associated with the at least one prepaid portable electronic device service, wherein each of the plurality of payment tiers specifies a different payment amount required to be paid for the same at least one prepaid portable electronic device service, the payment tier being associated with a payment amount corresponding to a discount for the at least one prepaid portable electronic device service, and wherein the payment tier is determined based on the tenure with the at least one prepaid portable electronic device service and the payment history with the at least one prepaid portable electronic device service compiled in the table, and
in response to determining the payment tier, set, in the database, a flag based on the determined payment tier,
subsequent to the flag being set, detect, via the communication network, an attempt to originate wireless communication by the portable electronic device, and
responsive to the detection of the attempt made by the portable electronic device to originate the wireless communication, determine an authorization based at least in part on the payment history before allowing the attempt to originate the wireless communication by the portable electronic device to continue processing in the communication network and provide the determined authorization to permit the wireless communication of the portable electronic device to proceed via the communication network; and
a computer system comprising a billing platform that bills the payment amount to an account associated with the portable electronic device based on the determined payment tier in response to the flag set by the server, wherein setting the flag causes the server to alter an amount of data that the portable electronic device may access via traversal over the communication network based on the payment tier determined.

11. The system of claim 10, wherein the origination of wireless communication includes any of origination of a voice call or a text message.

12. The system of claim 10, wherein the server remotely configures the firmware of the portable electronic device via over-the-air for connection to the communication network.

13. The system of claim 10, wherein the server is further configured to send, to the portable electronic device, a notification identifying the payment tier based on determining that the payment tier changed from a previous payment tier of the plurality of payment tiers.

14. The system of claim 10, wherein the server is further configured to send, to the portable electronic device subsequent to the flag being set, a notification identifying the determined payment tier.

15. The system of claim 10, wherein determination of the payment history by the server comprises determination whether a predetermined number of on-time payments have been made for the at least one prepaid portable electronic device service.

16. The system of claim 10, wherein the portable electronic device initially accesses the communication network via a peer portable electronic device acting as an intermediary to the wireless communication service provider.

17. The system of claim 16, wherein the server programs, over-the-air, the portable electronic device to display the payment tier currently designated to the portable electronic device.

* * * * *